United States Patent [19]
Evans

[11] 3,740,085
[45] June 19, 1973

[54] HOLDING UNITS
[76] Inventor: Michael C. Evans, 950 Adelaide Drive, Northbrook, Ill. 60062
[22] Filed: Aug. 9, 1971
[21] Appl. No.: 169,967

[52] U.S. Cl............................. 287/52.08, 287/52.09
[51] Int. Cl................................................ F16d 1/06
[58] Field of Search.................... 287/52.08, 52.04, 287/52.09, 52.03

[56] References Cited
UNITED STATES PATENTS
3,463,520  8/1969  Turro.............................. 287/52.08
513,118  1/1894  Kuhlmann.................... 287/52.04 X Primary Examiner—Andrew V. Kundrat
Attorney—Roote & O'Keeffe

[57] ABSTRACT

A holding unit in the form of a collar adapted to be mounted on a shaft, with a set screw mounted in the collar for securing the latter to the shaft, and with a plate-like insert mounted in the collar in position to be pressed by the screw against the shaft.

7 Claims, 8 Drawing Figures

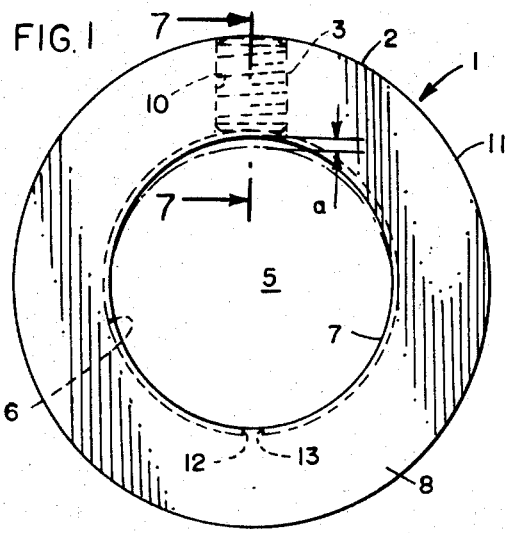
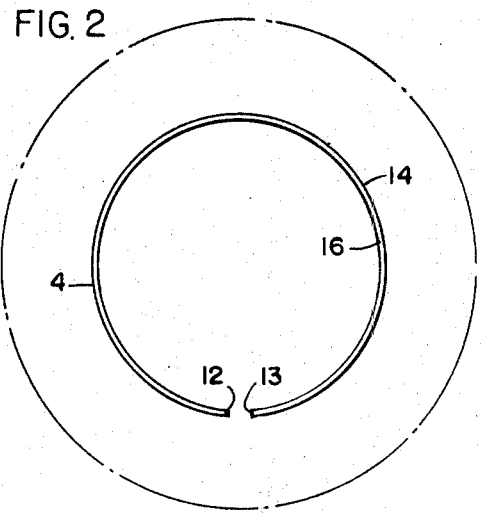
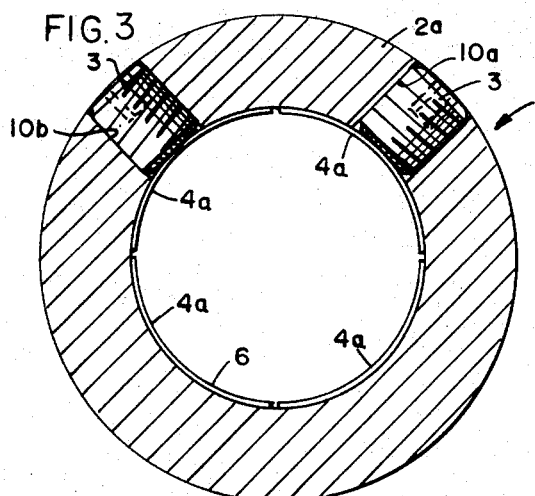
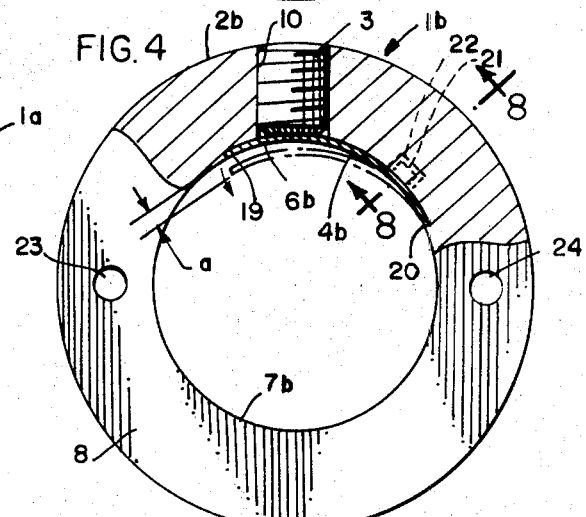
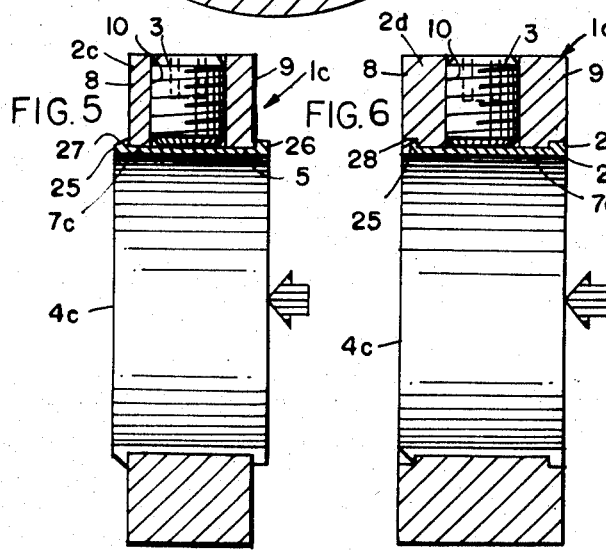
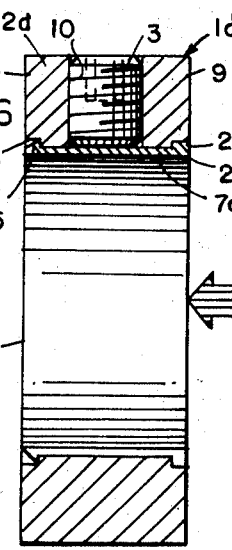
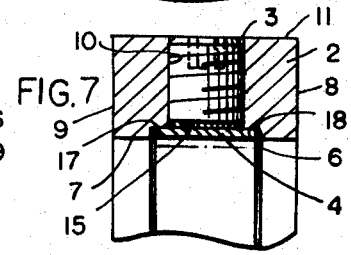
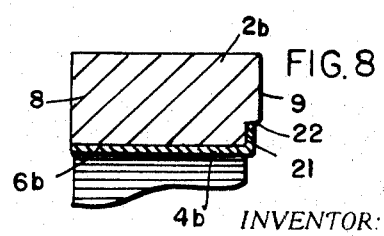
INVENTOR:
MICHAEL C. EVANS

3,740,085

HOLDING UNITS

BACKGROUND OF THE INVENTION

This invention relates to holding units and, more particularly, to holding units of a type particularly well adapted to be used as set collars, and the like.

It is a primary object of the present invention to afford a novel holding unit of the type adapted to be secured to a round shaft.

Another object is to afford a novel set collar adapted to be secured to a round shaft in a novel and expeditious manner.

Holding units in the form of set collars, and the like, adapted to be mounted on round shafts have been heretofore known in the art. Such holding units heretofore known commonly have embodied an annular body member, through which a shaft may be inserted, and a set screw adapted to be inserted radially inwardly through a peripheral portion of the body member into firm abutting engagement with the outer periphery of such a shaft for the intended purpose of holding the unit against movement relative to the shaft.

Such units heretofore known in the art commonly have had several inherent disadvantages, such as, for example, marring the outer periphery of a shaft to which the unit is attached, so that subsequent adjustment of the unit relative to the shaft is difficult to accomplish; or affording a "point" type of holding contact between a set screw and the adjacent surface of a shaft, which contact frequently does not afford even the initial desired torque and axial load capacities for the unit, and which contact is a frequent cause of loosening of the unit on the shaft because of the loss of screw point pressure on the shaft as the shaft surface is deformed and cut by the engaging screw end, and the like. It is an important object of the present invention to overcome such disadvantages.

Another object of the present invention is to afford a novel set collar embodying inserts constituted and arranged therein in a novel and expeditious manner.

An object ancillary to the foregoing is to afford novel inserts for a set collar.

Yet another object of the present invention is to enable a set collar, or the like, to be secured to a shaft in a novel and expeditious manner.

A further object is to afford a novel set collar which is effective in a novel and expeditious manner to protect against marring of a shaft on which it is mounted.

Another object of the present invention is to afford a novel set collar which is effective in a novel and expeditious manner to protect against loosening of the collar on a shaft on which it is operatively mounted.

Another object is to afford a novel set collar which is practical and efficient in operation, and which may be readily and economically produced commercially.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a side elevational view of a holding unit, in the form of a set collar, embodying the principles of the present invention;

FIG. 2 is a side elevational view of an insert member embodied in the holding unit shown in FIG. 1;

FIG. 3 is a sectional view, showing a modified form of the present invention;

FIG. 4 is a side elevational view, similar to FIG. 1, but showing another modified form of the present invention, and with a portion thereof shown in section to show underlying parts;

FIG. 5 is a transverse sectional view, showing another modified form of the present invention;

FIG. 6 is a view similar to FIG. 5, but showing another modified form of the present invention;

FIG. 7 is a fragmentary, transverse sectional view taken substantially along the line 7—7 in FIG. 1; and FIG. 8 is a fragmentary, transverse sectional view taken substantially along the line 8—8 in FIG. 4.

DESCRIPTION OF THE EMBODIMENTS SHOWN HEREIN

A holding unit in the form of a set collar 1 is shown in FIGS. 1, 2 and 7 of the drawings to illustrate the presently preferred embodiment of the present invention.

The set collar 1 embodies, in general, an annular body member in the form of a collar 2 having a set screw 3 mounted therein, and with an insert member 4 mounted in the collar 2 in position to be pressed inwardly by the set screw 3 when the latter is moved radially inwardly through the collar 2.

The collar 2 is annular in shape and may be constructed of any suitable material such as, for example, bar stock steel, or the like. It has a round opening 5 through the center thereof, the opening 5 preferably being of such size that it will receive the round shaft on which the set collar 1 is to be mounted with a relatively snug but freely slidable fit. An annular recess 6, FIGS. 1 and 7, is formed in and extends completely around the inner peripheral surface 7 of the collar 2 in inwardly spaced, centered position between the lateral side faces 8 and 9 of the collar 2, for a purpose which will be discussed in greater detail presently.

The set screw 3 is threadedly mounted in an opening 10 which extends radially inwardly through a portion of the collar 2 from the outer peripheral surface 11 to the inner peripheral surface 7 thereof, FIGS. 1 and 7.

The insert member 4 may be made of any suitable material, but preferably is made of a resilient, relatively hard metal, such as, for example, spring steel. In the presently preferred form of the invention shown in FIGS. 1, 2 and 7, the insert member 4, which is an elongated, longitudinally-arcuate member, is in the form of a snap ring, the ends 12 and 13 of which, when the arcuate member 4 is in fully expanded position, are spaced apart a minor portion of a circle, such as, for example, 15° to 20°. In the assembled set collar 1, the arcuate member 4 is disposed in the recess 6. Preferably, the arcuate member 4 is of such diameter that when it is disposed in operative position in the collar 2 it is held thereby in somewhat compressed position, but with the end portions 12 and 13 remaining separated from each other ten or fifteen degrees, as shown in FIG. 1. Also, preferably, the arcuate member 4 is of such thickness that when it is so mounted in the collar 2, with the outer periphery 14 thereof disposed in juxtaposition to the radially inwardly facing portion 15 of the recess 6, the inner peripheral surface 16 of the arcuate member 4 is disposed in uniplanar relation to the inner peripheral surface 7 of the collar 2. Preferably, the lateral width of the arcuate member 4 is such that, in the assembled set collar 1, it is disposed between the lateral edges 17 and 18 of the recess 6 with a relatively snug but freely slidable fit.

With the set collar 1 constructed in the aforementioned manner, when it is desired to mount the set collar 1 on a shaft, not shown, the shaft may be inserted through the opening 5 to the desired position, with the set screw 3 disposed in outwardly spaced relation to the arcuate member 4. Thereafter, the set screw 3 may be screwed inwardly into position to press the directly underlying portion of the arcuate member 4 into firm engagement with the adjacent outer peripheral surface of the shaft, to thereby secure the set collar 1 to the shaft. Preferably, the arcuate member 4 is so disposed in the collar 2 that the set screw 3 is engaged therewith in spaced relation to the end portions 12 and 13 so that the entire area of the surface of the shaft disposed in directly underlying relation to the set screw 3 is covered by the arcuate member 4. The force with which the arcuate member 4 is pressed into engagement with the shaft on which the set collar 1 is mounted may readily be adjusted by turning the set screw 3 into and out of the collar 2 to thereby increase and decrease the same.

With this construction, a contact area, which is considerably larger than the end of the set screw 3, is pressed against the shaft on which the set collar 1 is mounted. This affords effective protection against gouging or otherwise marring the shaft. In addition it affords a high torque and load capacity capability for the set collar 1.

One of the frequent causes of accidental loosening of set collars heretofore known in the art has been that set screws have been used in direct engagement with the shaft on which the set collar was to be mounted, and pressure between the end of the screw and the adjacent surface of the shaft has been lost as the shaft surface was deformed and cut by relative movement of the screw against the shaft, substantially only "point" pressure being afforded between the screw and the shaft. The set collar 1 protects against such accidental loosening by preventing relative, engaged movement between the set screw and the shaft, and, in addition, by affording a broader area of pressure contact with the shaft.

The holding device 1 shown in FIGS. 1, 2 and 7 is in the form of a set collar. However, this is merely by way of illustration and not by way of limitation and, as will be appreciated by those skilled in the art, other forms of holding units, such as, for example, hubs on wheels, and the like, may be substituted without departing from the broader aspects of the present invention and the purview of the appended claims.

In FIG. 3 a modified form of the present invention is shown and parts which are the same as parts shown in FIGS. 1, 2 and 7 are indicated by the same reference numerals, and parts which are similar to but have been substituted for parts shown in FIGS. 1, 2 and 7 are indicated by the same reference numerals with the suffix "a" added thereto.

The holding unit 1a, shown in FIG. 3 embodies a body member in the form of a collar 2a which is identical to the construction shown in FIG. 1, except that two openings 10a and 10b are afforded therein for receiving respective set screws 3. In the holding unit 1a, a plurality of elongated, longitudinally-arcuate insert members 4a are disposed in the recess 6 in the collar 2a in end-to-end relation to each other. Preferably, the insert members 4a are of equal length, and they are of such width that they fit into the recess 6 with a sufficiently snug fit to frictionally hold them in position therein when the set collar 1a is being handled in the normal manner, such as, for example, when it is being mounted on a shaft.

The insert members 4a preferably are so disposed in the collar 2a that respective ones thereof are disposed in underlying relation to the two set screws 3 so that when the holding unit 1a is mounted on a shaft and the set screws 3 are fed inwardly, each of the set screws 3 presses against a respective one of the insert members 4a.

In FIGS. 4 and 8 another modified form of the present invention is shown, and parts which are the same as parts shown in FIGS. 1, 2 and 7 are indicated by the same reference numerals, and parts which are similar to, but have been substituted for parts shown in FIGS. 1, 2 and 7 are indicated by the same refer-ence numerals with the suffix "b" added thereto.

The holding unit 1b shown in FIG. 4 embodies a body member in the form of a collar 2b which, unlike the collar 2 shown in FIG. 1, does not embody a recess extending around the entire inner peripheral surface. Instead, in the collar 2b, a recess 6b is formed. The recess 6b extends across the entire width of the collar 2b between the faces 8 and 9 thereof, FIG. 8, but it extends only around a minor portion of the inner periphery 7b, such as, for example, 90°, terminating in ends 19 and 20.

An elongated, longitudinally arcuate insert member 4b, similar to the arcuate members 4a shown in FIG. 3, but with an outwardly turned tab 21 projecting from one longitudinal edge thereof, is mounted in the recess 6b with the ends thereof disposed in abutting engagement with the ends 19 and 20 of the recess 4b. This engagement of the insert member 4b with the ends 19 and 20 of the recess 6b is effective to hold the insert member 4b against circumferential movement relative to the collar 2b. In the assembled holding unit 1b, the tab 21 is disposed in a recess 22, formed in the face 9 of the collar 2b and opening into the inner periphery 7b of the collar 2b, to thereby hold the insert member 4b against axial movement to the left, as viewed in FIG. 8, relative to the collar 2b.

The collar 2b also has two diametrically opposed openings 23 and 24 extending therethrough between the faces 8 and 9. With this construction, it will be seen that the holding member 1b may be mounted on a suitable member, not shown, such as, for example, a wheel, or the like, by inserting bolts through the openings 23 and 24 and into the wheel, to thereby hold the face 9 of the collar 2b against the side face of the wheel. Such engagement of a wheel, or the like, with the face 9 is effective to hold the insert member 4b from movement to the right, as viewed in FIG. 8, and it will be remembered that the tab 21 is effective to hold the insert member 4b against such movement to the left, as viewed in FIG. 8. Thus, with the holding unit 1b secured to another member in such a manner, the insert member 4b is effectively held against both circumferential movement and axial movement relative to the collar 2b.

The holding unit 1b also includes a set screw 3 threaded into an opening 10. The set screw 3 is disposed adjacent to a portion of the insert member 4b, remote from the tab 21, and is effective to press the insert member 4b inwardly in the same manner as heretofore discussed with respect to the set screws and insert members shown in FIG. 3.

In FIG. 5 another modified form of the present invention is shown and parts which are the same as parts shown in FIGS. 1, 2 and 7 are indicated by the same reference numerals, and parts which are similar to parts shown in FIGS. 1, 2 and 7, but which have been substituted therefor, are indicated by the same reference numerals with the suffix "c" added thereto.

The holding unit 1c shown in FIG. 5 embodies a body member in the form of a collar 2c which is identical in construction to the collar 2 shown in FIG. 1 except that no recess is formed in the inner peripheral surface 7c thereof.

Also, the holding unit 1c embodies an insert member 4c which is identical in construction in the insert member 4 shown in FIG. 2 except that it is wider and embodies two elongated ribs 25 and 26 extending along and projecting radially outwardly from the respective opposite longitudinal edges of the insert member 4c. The ribs 25 and 26 are spaced apart such a distance that, in the assembled holding unit 1c, they are disposed in abutting engagement with the adjacent faces 8 and 9, respectively, of the collar 2c, this engagement preferably being with a relatively snug but freely slidable fit.

As shown in FIG. 5, the rib 25 has an outer peripheral surface 27 which slopes radially outwardly from the outer edge of the rib 25 to the inner edge thereof, or, in other words, from the outer edge of the rib 25 toward the rib 26. The diameter of the insert member 25 at the outer edge of the peripheral surface 27 is smaller than the diameter of the inner peripheral surface 7c of the collar 2c. With this construction, in mounting the insert member 4c into the collar 2c, the rib 25 may first be inserted through the face 9, and the insert member 4c may then be pressed through the opening 5 in the collar 2c to the left, as viewed in FIG. 5. During such movement of the insert member 4c the engagement of the inner peripheral surface 7c of the collar 2c with the tapered outer peripheral surface 27 of the rib 5 is effective to cam the insert member 4c inwardly to thus facilitate the insertion of the insert member 4c into operative position in the collar 2c.

As in the collar 2 shown in FIG. 1, a set screw 3 is threadedly engaged in an opening 10 in the collar 2c in position to adjust the force with which the insert member 4c engages a shaft disposed in the collar 2c.

In FIG. 6 another modified form of the present invention is shown and parts which are the same as parts heretofore mentioned are indicated by the same reference numerals, and parts which are similar to but have been substituted for parts shown in FIGS. 1, 2 and 7 are indicated by the same reference numerals with the suffix "d" added thereto.

The holding unit 1d shown in FIG. 6 is identical in construction to the holding unit 1c shown in FIG. 5, except that the collar 2d is wider than the collar 2c, and embodies two annular recesses 28 and 29 in the faces 8 and 9 thereof, respectively, the recesses 28 and 29 opening into the inner peripheral surface 7d of the collar 2d.

In assembling the holding unit 1d, the insert member 4c may be inserted into the collar 2d in the same manner as heretofore described with respect to the insertion of the insert member 4c into the collar 2c. When the insert member 4c is disposed in operative position in the collar 2d, the ribs 25 and 26 are disposed in the recesses 28 and 29 so that the side edges of the insert member 4c in the holding unit 1d are flush with the respective opposite side faces 8 and 9 of the collar 2d.

As in the holding unit 1c, a set screw 3 is threadedly mounted in an opening 10 in the collar 2d to adjust the position of the insert member 4c of the holding unit 1d.

From the foregoing it will be seen that the present invention affords a novel holding unit, which is particularly well adapted for use as a set collar, and the like.

Also, it will be seen that the present invention affords a novel holding unit of the aforementioned type which is practical and efficient in operation and which may be readily and economically produced commercially.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A holding unit for use on a shaft and comprising,
   a. an annular body member adapted to be mounted on such a shaft in encircling relation thereto,
   b. arcuate means mounted on the inner periphery of said body member,
   c. a screw mounted in said body member in position to press said arcuate means against the outer periphery of such a shaft for holding said body member and said arcuate means against movement relative to said shaft when said body member is so mounted thereon,
   d. said body member having
      1. an inner peripheral portion, and
      2. two faces disposed on opposite sides of said peripheral portion,
   e. said arcuate means comprising an elongated, longitudinally arcuate member mounted in said body member in juxtaposition to said inner peripheral portion,
   f. said arcuate member including two abutment members
      1. projecting radially outwardly from respective opposite longitudinal edge portions thereof, and
      2. abuttingly engaged with respective ones of said faces,
   g. said abutment members comprising elongated ribs extending along respective longitudinal edge portions of said arcuate member, and
   h. the outer periphery of one of said ribs sloping outwardly at an acute angle to the inner periphery thereof in a direction toward the other of said ribs.

2. A holding unit as defined in claim 1, and in which
   a. said body has recesses
      1. in said faces and
      2. opening into said peripheral portion, and b. said ribs are disposed in respective ones of said recesses.

3. A holding unit for use on a shaft and comprising,
a. an annular body member adapted to be mounted on such a shaft in encircling relation thereto,
b. arcuate means mounted on the inner periphery of said body member,
c. a screw mounted in said body member in position to press said arcuate means against the outer periphery of such a shaft for holding said body member and said arcuate means against movement relative to said shaft when said body member is so mounted thereon,
d. said body member having
  1. an inner peripheral portion, and
  2. two faces disposed on opposite sides of said peripheral portion,
e. said arcuate comprising an elongated, longitudinally arcuate member mounted in said body member in juxtaposi-tion to said inner peripheral portion,
f. said arcuate member including
  1. an abutment member projecting radially outwardly from one longitudinal edge portion thereof,
  2. a central body portion, and
  3. a longitudinal terminal end extremity disposed on the opposite side of said central body portion from said one longitudinal edge portion and having a radial thickness within the limits of the radial thickness of said central body portion so as to be no greater than the radial thickness of said central body portion.

4. A holding unit as defined in claim 3, and in which
a. said abutment member comprises an elongated rib extending along said one longitudinal edge portion of said arcuate member,
b. said longitudinal terminal end extremity defines the outer face of another radially outwardly projecting, elongated rib extending along the other longitudinal edge portion of said arcuate member.

5. A holding unit as defined in claim 4, and in which
a. said body member has recesses
  1. in said faces, and
  2. opening into said inner peripheral portion, and
b. said ribs are disposed in respective ones of said recesses.

6. A holding unit as defined in claim 3, and in which
a. said body member has a recess in one of said faces and opening into said inner peripheral portion, and
b. said abutment member is disposed in said recess.

7. A holding unit as defined in claim 6, and in which
a. said body member has an elongated recess in said inner peripheral portion and extending around less than a major portion of said inner peripheral portion, and
b. said arcuate member is disposed in said last mentioned recess and abuttingly engaged with the ends of said recess.

* * * * *